(12) United States Patent
Hughes

(10) Patent No.: US 7,434,640 B2
(45) Date of Patent: Oct. 14, 2008

(54) METHOD FOR REDUCING TORQUE REQUIRED TO CRANK ENGINE IN HYBRID VEHICLE

(75) Inventor: Douglas A. Hughes, Wixom, MI (US)

(73) Assignee: Eaton Corporation, Cleveland, OH (US)

( * ) Notice: Subject to any disclaimer, the term of this patent is extended or adjusted under 35 U.S.C. 154(b) by 439 days.

(21) Appl. No.: 11/190,473

(22) Filed: Jul. 27, 2005

(65) Prior Publication Data

US 2007/0023213 A1 Feb. 1, 2007

(51) Int. Cl.
*B60K 6/00* (2007.10)
(52) U.S. Cl. .................................... 180/65.3; 180/65.2
(58) Field of Classification Search ............. 180/65.2, 180/65.3; 903/925, 926, 927, 941
See application file for complete search history.

(56) References Cited

U.S. PATENT DOCUMENTS

| | | | | |
|---|---|---|---|---|
| 4,217,796 | A | * | 8/1980 | Donohue .................... 477/111 |
| 5,178,103 | A | * | 1/1993 | Simko ....................... 123/48 B |
| 5,632,238 | A | | 5/1997 | Furukawa et al. |
| 5,725,064 | A | | 3/1998 | Ibaraki et al. |
| 5,992,367 | A | * | 11/1999 | Santi et al. ............... 123/182.1 |
| 6,286,473 | B1 | | 9/2001 | Zaremba |
| 6,510,370 | B1 | | 1/2003 | Suzuki et al. |
| 6,659,069 | B2 | * | 12/2003 | Shiraishi et al. ............ 123/298 |
| 7,231,998 | B1 | * | 6/2007 | Schechter ................... 180/165 |
| 2002/0121256 | A1 | * | 9/2002 | Warren et al. ............. 123/179.3 |
| 2003/0041837 | A1 | * | 3/2003 | Kolmanovsky et al. ..... 123/295 |
| 2004/0102286 | A1 | * | 5/2004 | Tabata et al. .................... 477/3 |
| 2004/0144342 | A1 | * | 7/2004 | Sieber et al. ............... 123/48 R |
| 2004/0231623 | A1 | * | 11/2004 | El Tahry et al. .......... 123/90.15 |
| 2005/0132982 | A1 | * | 6/2005 | El Tahry et al. ............ 123/27 R |
| 2005/0166874 | A1 | * | 8/2005 | Inomoto et al. .......... 123/90.15 |
| 2005/0228575 | A1 | * | 10/2005 | Murakami et al. .......... 701/112 |
| 2006/0137921 | A1 | * | 6/2006 | Colvin et al. .............. 180/65.2 |

FOREIGN PATENT DOCUMENTS

| | | |
|---|---|---|
| DE | 198 14 402 A1 | 10/1999 |
| EP | 1 177 928 A2 | 2/2002 |
| JP | 08 135546 A | 5/1996 |
| WO | WO 2005/068240 A1 | 7/2005 |

OTHER PUBLICATIONS

International Search Report for Application No. PCT/IB2006/002067 Mailed Dec. 20, 2006.
Written Opinion of the International Searching Authority for Application No. PCT/IB2006/002067.

* cited by examiner

Primary Examiner—Christopher Ellis
Assistant Examiner—John R Olszewski
(74) Attorney, Agent, or Firm—Dykema Gossett PLLC

(57) ABSTRACT

A method of operating a hybrid powertrain system is provided for a vehicle that includes an internal combustion engine having an engine output to drive the vehicle and a motor having a motor output to drive the vehicle. The motor is operatively connected to the engine and operable to crank the engine. The method includes the steps of reducing compression in at least one engine cylinder and operating the motor to crank the engine. A hybrid powertrain system for a hybrid vehicle is also provided.

8 Claims, 2 Drawing Sheets

METHOD FOR REDUCING TORQUE REQUIRED TO CRANK ENGINE IN HYBRID VEHICLE

BACKGROUND OF THE INVENTION

1. Field of the Invention

The present invention relates to a hybrid vehicle and to a method for reducing the torque required to crank an engine in a hybrid vehicle.

2. Description of the Related Art

The motor vehicle industry is actively working to develop alternative powertrain systems in an effort to improve vehicle fuel economy and reduce the level of pollutants exhausted into the air by conventional powertrain systems equipped with internal combustion engines. Significant development efforts have been directed to electric and fuel-cell vehicles. Unfortunately, these alternative powertrain systems currently suffer from several limitations and, for all practical purposes, are still under development. However, "hybrid" vehicles, which typically include an internal combustion engine and an electric motor and/or generator, offer a compromise between traditional internal combustion engine powered vehicles and full electric powered vehicles.

Hybrid vehicles are generally classified as either series hybrid vehicles or parallel hybrid vehicles. In a series hybrid vehicle, a generator is driven by the mechanical output of an internal combustion engine. The output of the generator may be combined with the output of a vehicle battery to drive an electric motor, which in turn drives the vehicle.

Parallel hybrid vehicles, on the other hand, are usually driven directly by the mechanical output of the internal combustion engine. However, when the vehicle must be accelerated or decelerated at a rate that cannot be accomplished by the internal combustion engine alone, the electric motor-generator, which is mechanically connected to the internal combustion engine, operates as an electric motor (on acceleration) or as an electric generator (on deceleration) to meet the required rate of acceleration or deceleration through the combined output of the internal combustion engine and the electric motor-generator.

In a particular parallel hybrid configuration, the engine is started using the output of the hybrid electric motor. A limitation of this particular configuration is that the torque required to crank and start the engine, particularly a large displacement engine, may periodically exceed the torque-generating capability of the electric motor due to the hybrid battery becoming depleted. Additionally, relatively large displacement internal combustion engines may generate excessive noise and vibration during start-up, which may be undesirably perceived by the vehicle operator.

SUMMARY OF THE INVENTION

A method of operating a hybrid powertrain system is provided for a hybrid vehicle that includes an internal combustion engine having an engine output to drive the vehicle and a motor having a motor output to drive the vehicle. The motor is operatively connected to the engine and operable to crank the engine. The method includes the steps of reducing compression in at least one engine cylinder and operating the motor to crank the engine. A hybrid powertrain system for a hybrid vehicle is also provided. Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein.

DETAILED DESCRIPTION

Figure 1:
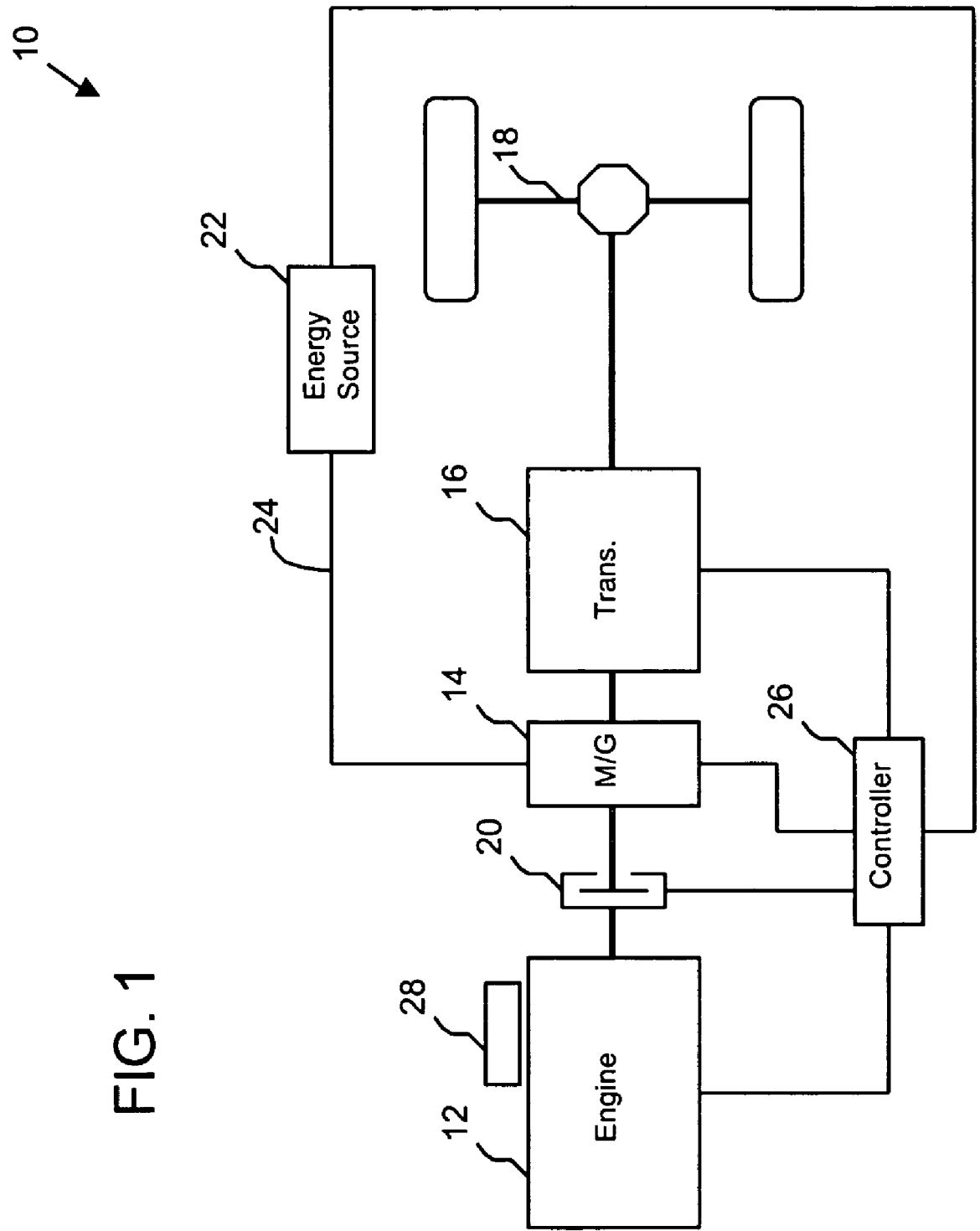
FIG. 1 is a schematic illustration of an exemplary hybrid vehicle powertrain system.

Referring to FIG. 1, an exemplary hybrid vehicle powertrain system 10 is shown. In the exemplary system, hybrid powertrain 10 includes an engine 12, such as a diesel or gasoline-fueled internal combustion engine, an electric or hydraulic motor-generator 14, and an engine and/or motor-driven power transmission mechanism 16. Hybrid powertrain 10 operates as a parallel hybrid powertrain system, permitting motor-generator 14 to drive power transmission mechanism 16 alone or in combination with engine 12 to provide motive power to a vehicle drive-axle 18. An optional clutch 20 may be positioned between engine 12 and motor-generator 14 to selectively couple or uncouple engine 12 from motor-generator 14 and/or power transmission mechanism 16. In this manner, motor-generator 14 is operatively connected to engine 12 and may be operated as a starter motor to apply torque to crank and start engine 12. Hybrid powertrain system configuration shown in FIG. 1 is provided for reference only and is not intended to limit the scope of the present invention.

The energy required to operate motor-generator 14 may be supplied by an energy source 22, including, without limitation, a battery, a bank of batteries or a hydraulic accumulator. As an example, energy source 22 will be described herein below as a battery for storing the electrical energy needed to power an electric motor 14. In the illustrated embodiment, energy source 22 is electrically linked to motor-generator 14 by an electrical bus 24, such as a 42V bus.

Operation of hybrid powertrain system 10 is controlled by a controller 26, such as a microprocessor-based electronic control unit. Controller 26 may include or be linked to one or more sub-controllers (not shown), such as a battery controller, for controlling operation of one or more individual powertrain components. Controller 26 may also communicate with a vehicle engine controller (not shown), which may also be contained in the same unit.

Engine 12 may also include a compression reducing device 28, such as an engine brake or other device that controls actuation of an engine valve(s) independent of the crankshaft position. In an embodiment, compression reducing device 28 is mounted on, or within, the engine overhead, and is adapted to change the opening timing of the engine exhaust valves to reduce compression in at least one engine cylinder (neither shown). In this manner, the cylinder pressure and the load required to turn the engine crankshaft may be selectively reduced. In a particular configuration, compression reducing device 28 is adapted to open at least one engine exhaust valve during or near the compression stroke of a corresponding engine piston.

Figure 2:
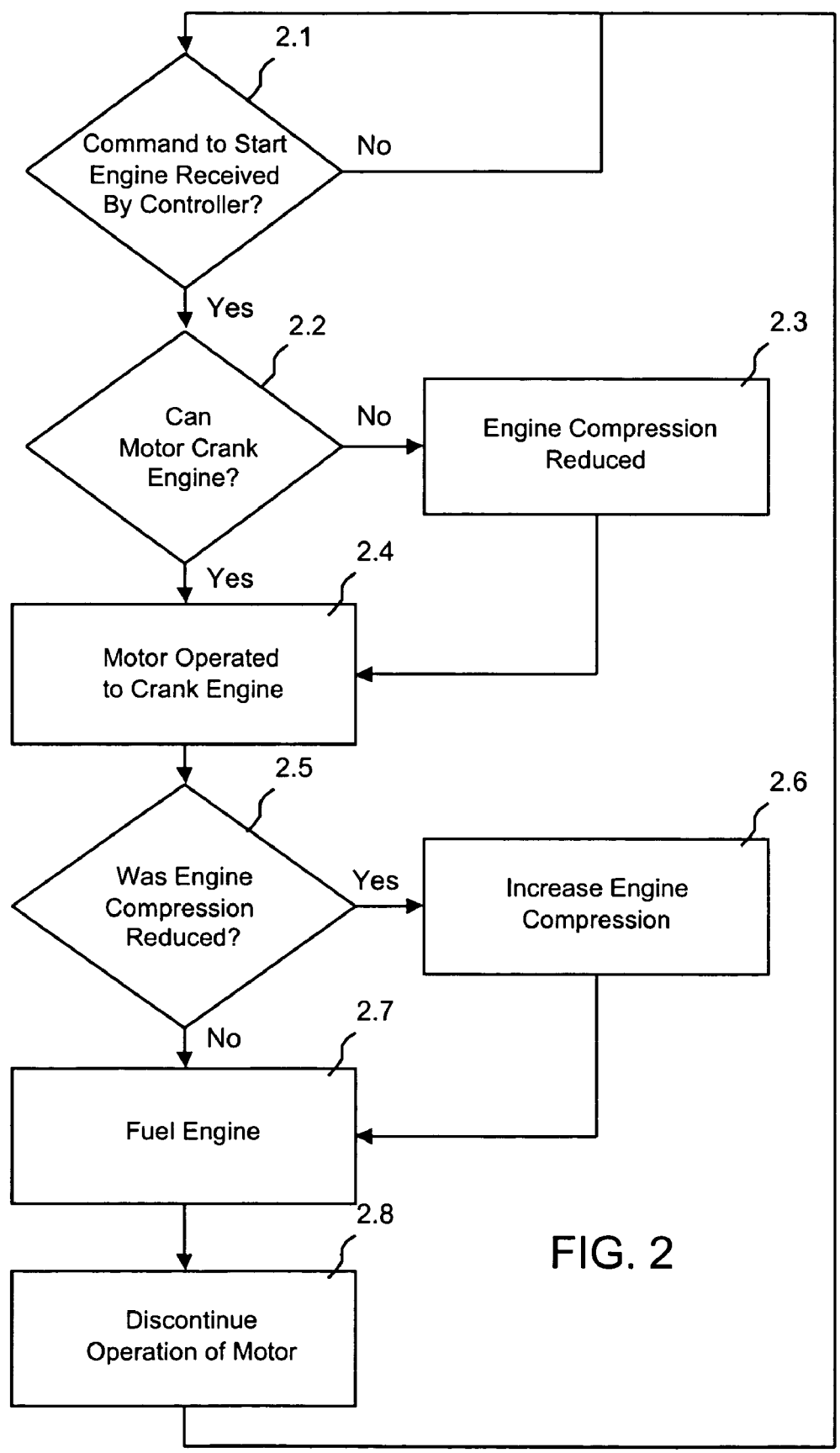
FIG. 2 illustrates a logic flow diagram for operating a hybrid powertrain system according to an embodiment of the present invention.

A method of operating a hybrid powertrain system according to an embodiment of the present invention will now be described with reference to FIG. 2. In an embodiment, when a command to start internal combustion engine 12 is received by controller 26 (step 2.1), controller 26 may first determine whether electric motor 14 is capable of cranking internal combustion engine 12 (step 2.2). In a particular configuration, controller 26 monitors the state of charge (SOC) of energy source 22 to determine whether energy source 22 can provide the requisite energy for motor 14 to crank and start engine 12.

If motor 14 is incapable of cranking engine 12, such as when energy source 22 is sufficiently depleted to prevent motor 14 from cranking engine 12 under full compression, controller 26 is configured to selectively operate compression-reducing device 28 to reduce the compression in at least one cylinder of the engine and, accordingly, to reduce the torque or power required to crank engine 12 (step 2.3). For example, compression-reducing device 28 may open at least one engine exhaust valve during or near the compression stroke of a corresponding engine piston, thereby reducing the cylinder pressure and the torque required to turn the engine crankshaft. Alternatively, controller 26 may be configured to operate compression-reducing device 28 to reduce compression in at least one cylinder of engine 12 regardless of the cranking capability of motor 14. Additionally, controller 26 may operate compression-reducing device 28 to open the exhaust valves in any number of engine cylinders to achieve the desired torque reduction.

Referring to step 2.4, motor 14 may be operated to crank engine 12 to a predetermined speed or according to a target speed profile once engine compression is reduced or controller 26 determines that motor is capable of cranking engine 12 without reducing compression. When the desired crankshaft speed of engine 12 is achieved, controller 26 may command compression-reducing device 28 to return the valve(s) to its normal position to increase compression in the corresponding engine cylinder(s) (step 2.6), if it is determined that compression was previously reduced (step 2.5). Engine 12 may then be selectively fueled during or after the step of increasing the engine compression (step 2.7), such as by slowly ramping-up delivery of fuel to engine 12. Once engine 12 has started, operation of motor 14 may be discontinued, such as by ramping-down the torque or power provided to engine 12 by motor 14 (step 2.8).

As will be appreciated, selectively reducing the compression in engine 12 permits the hybrid powertrain motor 14 to crank and start engine 12 in conditions where the desired operation would not have otherwise been permitted. For example, when energy source 22 is incapable of supplying the required level of energy to motor 14 to crank and start engine 12 under full compression, a reduction in engine compression may reduce the torque required to turn the engine crankshaft to a level where motor 14 may crank the engine with energy source's current charge. Additionally, cooperatively utilizing the relatively fast cranking speed of the hybrid motor 14 and the ability to reduce engine compression and ramp fuel delivery during start-up mitigate the noise and vibration perceived by the vehicle operator during engine start-up, particularly when compared to conventional starting methods that utilize a relatively slow 12vDC starter motor to crank the engine while over-fueling the engine to ensure combustion.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is ended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A hybrid powertrain system for a hybrid vehicle, comprising:
    an internal combustion engine including an engine cylinder compression-reducing device that controls actuation of an engine valve independent of a crankshaft position and an engine output operable to drive the vehicle;
    a motor operatively connected to the internal combustion engine and adapted to crank the internal combustion engine in at least one mode of operation, the motor including a motor output operable to drive the vehicle; and
    a controller configured to selectively operate the compression-reducing device prior to or during the at least one mode of operation to reduce the torque or power required to crank the engine.

2. The hybrid powertrain system of claim 1, wherein the controller is further configured to determine whether the motor is capable of cranking the internal combustion engine prior to reducing compression in the engine.

3. The hybrid powertrain system of claim 1, wherein the controller is configured to selectively operate the compression-reducing device prior to reducing compression in at least one engine cylinder.

4. The hybrid powertrain system of claim 1, wherein the compression-reducing device is adapted to open at least one engine valve during or near the compression stroke of a corresponding engine piston prior to or during the at least one mode of operation.

5. The hybrid powertrain system of claim 1, wherein the controller is configured to operate the compression-reducing device to reduce compression in at least one engine cylinder; to operate the motor to crank the engine to a predetermined speed or according to a target speed profile once the compression is reduced; to discontinue operation of the compression-reducing device after the predetermined speed or target speed profile is achieved to allow the engine cylinder to return to a normally compressed state; and to discontinue operation of the motor after the internal combustion engine starts.

6. The hybrid powertrain system of claim 5, wherein controller is further configured to ramp-down the torque or power provided by the motor as the controller discontinues operation of the motor.

7. The hybrid powertrain system of claim 5, wherein the controller is further configured to selectively fuel the engine after increasing compression in the engine cylinder.

8. The hybrid powertrain system of claim 7, wherein the controller is further configured to ramp-up delivery of fuel to the engine after increasing compression in the engine cylinder.

* * * * *